United States Patent
Lee et al.

(10) Patent No.: US 12,034,188 B2
(45) Date of Patent: Jul. 9, 2024

(54) GRAPHITIZED CARBON SUBSTRATE AND GAS DIFFUSION LAYER EMPLOYING SAME

(71) Applicant: JNTG Co., Ltd., Hwaseong-si (KR)

(72) Inventors: Eun Sook Lee, Suwon-si (KR); Jy Young Jyoung, Suwon-si (KR); Na Hee Kang, Osan-si (KR); Do Hun Kim, Osan-si (KR); Tae Hyung Kim, Hwaseong-si (KR); Eun Chong Kim, Osan-si (KR); Tae Nyun Kim, Hwaseong-si (KR)

(73) Assignee: JNTG CO., LTD., Gyeonggi-do (KR)

( * ) Notice: Subject to any disclaimer, the term of this patent is extended or adjusted under 35 U.S.C. 154(b) by 534 days.

(21) Appl. No.: 17/416,986

(22) PCT Filed: Dec. 3, 2019

(86) PCT No.: PCT/KR2019/016898
§ 371 (c)(1),
(2) Date: Jun. 21, 2021

(87) PCT Pub. No.: WO2020/130420
PCT Pub. Date: Jun. 25, 2020

(65) Prior Publication Data
US 2022/0077476 A1    Mar. 10, 2022

(30) Foreign Application Priority Data

Dec. 19, 2018    (KR) .......................... 10-2018-0165471

(51) Int. Cl.
*H01M 8/04*        (2016.01)
*H01M 8/0234*      (2016.01)
(Continued)

(52) U.S. Cl.
CPC ....... *H01M 8/0234* (2013.01); *H01M 8/0245* (2013.01); *H01M 8/1004* (2013.01)

(58) Field of Classification Search
CPC . H01M 8/0234; H01M 8/0245; H01M 8/1004
See application file for complete search history.

(56) References Cited

U.S. PATENT DOCUMENTS

| 2006/0093893 | A1* | 5/2006 | Matsuo ................. | H01M 4/926 |
|   |   |   |   | 429/492 |
| 2013/0209881 | A1* | 8/2013 | Do ........................ | H01M 4/366 |
|   |   |   |   | 429/231.9 |
| 2018/0069245 | A1* | 3/2018 | Inoue ..................... | C01B 32/05 |

FOREIGN PATENT DOCUMENTS

| KR | 20110056548 A | 5/2011 |
| KR | 20150088006 A | 7/2015 |

(Continued)

*Primary Examiner* — Olatunji A Godo
(74) *Attorney, Agent, or Firm* — FARBER LLC; Jonathan Winter (57) ABSTRACT

A carbon substrate for a gas diffusion layer of a fuel cell, the carbon substrate being a porous carbon substrate having a first surface and a second surface opposite the first surface, the carbon substrate includes a plurality of carbon fibers arranged irregularly to form a non-woven type and a carbide of an organic polymer located between the carbon fibers to bind the carbon fibers to each other, the carbide has a graphite structure, and the carbon substrate has a Bragg diffraction angle 2θ of less than 26.435° and a interplanar distance d(002) of less than 3.372 Å, a gas diffusion layer employing the same, an electrode for a fuel cell, a membrane electrode assembly for a fuel cell, and a fuel cell. When the gas diffusion layer is manufactured using the carbon substrate according to the present disclosure, cell voltage characteristics of the fuel cell may be greatly improved.

13 Claims, 2 Drawing Sheets

(51) Int. Cl.
*H01M 8/0245* (2016.01)
*H01M 8/1004* (2016.01)

(56) References Cited

FOREIGN PATENT DOCUMENTS

| | | | |
|---|---|---|---|
| KR | 20160120060 | A | 10/2016 |
| KR | 20170118545 | A | 10/2017 |
| KR | 20180036107 | A | 4/2018 |
| WO | 2008032802 | A1 | 3/2008 |

\* cited by examiner

GRAPHITIZED CARBON SUBSTRATE AND GAS DIFFUSION LAYER EMPLOYING SAME

FIELD OF THE INVENTION

The present disclosure relates to a carbon substrate for a gas diffusion layer of a fuel cell, a gas diffusion layer employing the same, an electrode for a fuel cell, a membrane electrode assembly for a fuel cell, and a fuel cell, and more particularly to a carbon substrate having a graphitized structure, a gas diffusion layer employing the same, an electrode for a fuel cell, a membrane electrode assembly for a fuel cell, and a fuel cell.

The present disclosure relates to results of a task (Task number R0006741) performed with the support of a regional new industry promotion project (Managing agency: Korea Institute for Advancement of Technology) of the Ministry of Trade, Industry and Energy.

BACKGROUND OF THE INVENTION

A polymer electrolyte membrane fuel cell (PEMFC) has a low operating temperature and high efficiency, has high current density and output density, has a short start-up time, and has a rapid response to load changes, as compared with other types of fuel cells. A polymer electrolyte membrane fuel cell includes a membrane electrode assembly (MEA), in which a catalyst is applied onto each of a fuel electrode and an air electrode of a polymer electrolyte membrane to be formed into a catalyst-coated membrane (CCM) and a gas diffusion layer is bonded onto the applied catalyst, and bipolar plates adhered to both sides of the membrane electrode assembly. Here, the gas diffusion layer (GDL) is produced by coating a carbon substrate made of a porous carbon material, such as carbon cloth, carbon non-woven fabric, and carbon paper, with a microporous layer (MPL).

Currently, an important issue with hydrogen fuel cell vehicles is to achieve the development of parts and materials capable of reducing the volumes of existing parts, reducing the prices thereof, increasing the durability thereof, and realizing high performance thereof. Therefore, the gas diffusion layer for application to automobiles is required not only to reduce the thickness of the gas diffusion layer, but also to have high electrical conductivity capable of realizing high cell performance.

SUMMARY OF THE INVENTION

An object of the present disclosure is to provide a carbon substrate for a gas diffusion layer of a fuel cell, the carbon substrate having high electrical conductivity.

Another object of the present disclosure is to provide a gas diffusion layer for a fuel cell, the gas diffusion layer including the carbon substrate.

Another object of the present disclosure is to provide a membrane electrode assembly having improved cell performance, the assembly including the gas diffusion layer for a fuel cell.

Another object of the present disclosure is to provide a fuel cell having improved cell performance, the fuel cell including the gas diffusion layer.

According to an aspect of the present disclosure, there is provided a carbon substrate for a gas diffusion layer of a fuel cell,
the carbon substrate being a porous carbon substrate having a first surface and a second surface opposite the first surface, wherein
the carbon substrate includes a plurality of carbon fibers arranged irregularly to form a non-woven type and a carbide of an organic polymer located between the carbon fibers to bind the carbon fibers to each other, the carbide has a graphite structure, and
the carbon substrate has a Bragg diffraction angle $2\theta$ of less than $26.435°$ and a interplanar distance d(002) of less than $3.372$ Å.

In an embodiment of the present disclosure, the carbon substrate may have a Bragg diffraction angle $2\theta$ of $26.398°$ or more and less than $26.435°$. In an embodiment of the present disclosure, the carbon substrate may have a interplanar distance d(002) of $3.356$ Å or more and less than $3.372$ Å.

In an embodiment of the present disclosure, the carbon fibers may include one type of carbon fibers having the same average length.

In an embodiment of the present disclosure, the carbon fibers may include two or more types of carbon fibers having different average lengths from each other. In an embodiment of the present disclosure, the two or more types of carbon fibers may include first carbon fibers having a first average length and second carbon fibers having a second average length, the first average length may be less than the second average length, each of the first average length and the second average length may be in a range of 3 mm to 25 mm, and a difference between the first average length and the average length may be 3 mm to 20 mm.

According to another aspect of the present disclosure, there is provided a gas diffusion layer for a fuel cell, the gas diffusion layer, including: the carbon substrate according to an aspect of the present disclosure; and a microporous layer formed on the carbon substrate.

According to yet another aspect of the present disclosure, there is provided an electrode for a fuel cell, the electrode comprising: the carbon substrate according to an aspect of the present disclosure or the gas diffusion layer according to another aspect of the present disclosure.

According to yet another aspect of the present disclosure, there is provided a membrane electrode assembly including the electrode according to yet another aspect of the present disclosure.

According to yet another aspect of the present disclosure, there is provided a fuel cell comprising the membrane electrode assembly according to yet another aspect of the present disclosure.

The present inventors have found a phenomenon in which electrical conductivity of the carbon substrate is significantly improved as compared with a carbon substrate known in the art when the carbon substrate is subjected to a graphitization process of higher than $2000°$ C. to control the Bragg diffraction angle $2\theta$ of the carbon substrate to be less than $26.435°$ and control the interplanar distance d(002) thereof to be less than $3.372$ Å. Therefore, when a gas diffusion layer is manufactured using the carbon substrate according to the present disclosure, cell voltage characteristics of a fuel cell can be greatly improved.

Accordingly, a gas diffusion layer, a fuel cell electrode, a membrane electrode assembly, and a fuel cell employing the carbon substrate according to the present disclosure, can exhibit stable battery performance over a long period of time.

DETAILED DESCRIPTION OF THE INVENTION

Hereinafter, a carbon substrate for a gas diffusion layer of a fuel cell according to various embodiments of the present disclosure, a method of manufacturing the same, an electrode including the same, a membrane electrode assembly including the same, and a fuel cell including the same will be described in detail. However, the following descriptions are only for illustrative purposes. Therefore, it is obvious to those skilled in the art that they may be variously modified and changed.

When manufacturing a carbon substrate for a gas diffusion layer by a conventional wet-laid papermaking process, a method of passing a dispersion containing carbon fibers randomly suspended in a dispersion medium through a wire mesh is used. The dispersion may further include short binder fibers. The short binder fiber may be one or two or more selected from the group consisting of a short polyvinyl alcohol (PVA) fiber, a low melting point (LM) polyester short fiber, a polyethylene (PE) short fiber, a polypropylene (PP) short fiber, a cellulose short fiber, and a pitch short fiber. In this case, carbon fibers are randomly deposited on the wire mesh of the papermaking machine to form a two-dimensional carbon fiber pre-web. After the formation of the carbon fiber pre-web, the carbon fiber pre-web is impregnated with a slurry containing a carbon filler and a thermosetting resin such as an epoxy resin or a phenolic resin, and then dried to obtain an impregnated carbon fiber pre-web. By applying heat and pressure to the impregnated carbon fiber pre-web obtained in this way, the thermosetting resin is cured and the carbon fiber pre-web is compressed. When the carbon fiber pre-web is heated in an inert atmosphere to carbonize the thermosetting resin and the binder fibers, and in some cases, to graphitize the carbon fibers, thermosetting resin and the binder fibers, a carbon fiber web may be obtained.

However, the present inventors have found a problem that the electrical resistance of the obtained carbon substrate is not sufficiently lowered when the heat treatment temperature of a graphitization process is less than 2,000° C. as in a conventional carbon substrate manufacturing process. In order to solve the problem of low electrical conductivity of the carbon substrate, the present inventors have found a problem that when an electrically conductive filler is added to a carbon substrate, the porosity of the carbon substrate is lowered, and when a gas diffusion layer is manufactured using this carbon substrate having low porosity, the ability to discharge water generated during fuel cell operation is greatly reduced. When such a gas diffusion layer is used, water flooding may easily occur, and thus the performance of a fuel cell will rapidly deteriorate.

The present inventors have confirmed that the above problems can be effectively solved by employing the carbon substrate according to the present disclosure having the above configuration.

The carbon substrate according to an aspect of the present disclosure may be used as a carbon substrate for a gas diffusion layer of a fuel cell. The carbon substrate is a porous plate-shaped carbon substrate having a first surface, for example, an upper surface, and a second surface, for example, lower surface, opposite to the first surface. The carbon substrate includes a plurality of carbon fibers randomly arranged to form a non-woven type, and a carbide of an organic polymer that binds the carbon fibers therebetween.

The carbon fibers may include one type of carbon fibers having an average length in a range of 3 mm to 25 mm. Alternatively, the carbon fibers may include two or more types of carbon fibers having different average lengths. The two or more types of carbon fibers may include first carbon fibers having a first average length and second carbon fibers having a second average length. The first average length may be less than the second average length, each of the first average length and the second average length may be in a range 3 mm to 25 mm, and the difference between the first average length and the average length may be 3 mm to 20 mm. When each of the lengths of the first and second carbon fibers is less than 3 mm, electrical conductivity may be lowered due to many contact points between the carbon fibers, bending strength may be lowered, and tensile strength may be lowered. When each of the lengths of the first and second carbon fibers is more than 25 mm, filament-shaped carbon fibers may be aggregated without being properly dispersed into the respective carbon fibers, so that a high thickness variation may be obtained.

The diameter of the carbon fiber is not particularly limited, and may be, for example, 3 μm to 15 μm. It is preferable that the difference in length between the first and second carbon fibers is 3 mm to 20 mm. When the difference in length between the two carbon fibers is less than 3 mm, effects of a density gradient and a porosity gradient of the carbon substrate are small. When the difference in length therebetween is more than 20 mm, due to the abrupt density difference between the upper and lower carbon fiber substrates in the thickness direction, the mechanical strength of the carbon substrate may be deteriorated, and the carbon substrate may be bent in one direction. Therefore, it is advantageous to use carbon fibers having a difference in length of 5 mm to 20 mm between the two carbon fibers.

The carbon fibers include carbon fiber filaments prepared by carbonizing and/or graphitizing precursor fibers such as polyacrylonitrile (PAN), pitch, or rayon, short carbon fibers obtained by cutting the carbon fiber filaments, or tow forms thereof. Filaments or short fibers of carbon fibers sold under the registered trademark Tansome series by Hyosung Advanced Materials Corporation, carbon fibers sold under the registered trademark Torayca series by Toray Industries, carbon fibers sold under the trademark Panex™ PX series by Zoltek Corporation, carbon fibers sold under the registered trademark Sigrafil series by SGL Carbon SE, and carbon fibers sold under the trade name TC series by Formosa Plastics Corporation, or tow forms thereof may be exemplified.

The carbon substrate may further include carbon powders to improve electrical conductivity. The carbon powders may be at least one selected from carbon black, carbon aerosol, carbon nanotube, carbon nanofiber, carbon nanohorn powders, and natural or synthetic graphite powders.

The thickness of the carbon substrate is not particularly limited, but may be 20 μm to 1000 μm, for example, 20 μm to 500 μm, 30 μm to 400 μm, 30 μm to 300 μm, 30 μm to 200 μm, or 30 μm to 100 μm.

The carbide has a pronounced graphite structure. That is, the carbon substrate according to the present disclosure has a pronounced graphite structure by undergoing a graphitization process in which the carbon substrate is heat-treated at a temperature of more than 2,000° C., for example, more than 2,100° C., more than 2,200° C., more than 2,300° C., or more than 2,400° C. in an inert gas atmosphere such as nitrogen or argon gas during the manufacturing process.

A pure graphite structure in the X-ray diffraction diagram shows a characteristic diffraction peak around $2\theta=26.7°$, and a interplanar distance (interlayer spacing) d(002) in a hexagonal crystal structure is 3.354 Å. Therefore, it may be said that a degree of graphitization is higher as the interplanar distance d(002) of the carbon substrate is closer to 3.354 Å. The interplanar distance d(002) of the carbon substrate of the present disclosure approaches much closer to the interplanar distance d(002) (for example, 3.356 Å) of the graphite crystal structure compared to the interplanar distance of about 3.372 Å of a conventional carbon substrate, thereby having succeeded in making it have a crystal structure similar to that of the pure graphite crystal structure. Such a structure similar to pure graphite provided in the carbon substrate of the present disclosure is referred to herein as a 'pronounced graphite structure'. Here, the ' pronounced graphite structure' means that the Bragg diffraction angle $2\theta$ of the carbon substrate is less than 26.435°, and the (002) interplanar distance d(002) thereof is less than 3.372 Å. For example, the 'pronounced graphite structure' may be defined that the Bragg diffraction angle $2\theta$ of the carbon substrate is 26.398° or more and less than 26.435°, and the interplanar distance d(002) thereof is 3.356 Å or more and less than 3.372 Å, specifically. 3.356 Å to 3.369 Å.

The carbon substrate according to the present disclosure can reduce electrical resistance while maintaining durability by providing the above-described pronounced graphite structure by performing a graphitization process at a high temperature. As a result, as can be seen from the comparison of the results of Examples 4 to 6 and Comparative Example 2 below, when a gas diffusion layer is manufactured using the carbon substrate according to the present disclosure, since the electrical resistance value of the carbon substrate is lowered, the overall electrical resistance value of the gas diffusion layer is lowered, thereby obtaining a novel gas diffusion layer capable of improving cell performance from a low-current-density region.

Next, a method of manufacturing a carbon substrate for a gas diffusion layer of the present disclosure, and a method of manufacturing the gas diffusion method using the same will be described in detail.

(1) Preparation of Non-Woven Carbon Fiber Structure (Carbon Fiber Pre-Web)

When a conventional papermaking method by wet dispersion is used, it is possible to obtain a carbon fiber structure, that is, a carbon fiber pre-web, having an isotropic structure in which carbon fibers are randomly arranged. Specifically, the preparation of a non-woven type using carbon fibers may be performed using a wet-laid process. That is, a single type or two or more types of carbon fibers of different lengths are mixed in a state in which the carbon fibers are fully dispersed in a dispersion medium in an opening machine, and the carbon fiber dispersion obtained in this way are supplied to a papermaking machine to be laminated on a wire mesh (belt) of the papermaking machine. At this time, the carbon fiber dispersion may include a dispersant so as to lower the surface energy of the carbon fibers. The dispersion may further include short binder fibers in addition to the carbon fibers. The short binder fibers may be one or two or more selected from the group consisting of a short polyvinyl alcohol (PVA) fiber, a low-melting (LM) polyester short fiber, a polyethylene (PE) short fiber, a polypropylene (PP) short fiber, a cellulose short fiber, and a pitch short fiber.

In this case, the areal weight and thickness of the carbon fibers may be controlled by the supply amount and papermaking speed of the carbon fibers supplied to the papermaking machine. The structure of the irregular carbon fiber non-woven pre-web may be a structure in which a contact surface contacting the wire mesh and a surface opposite to the contact surface are the same as each other, or may be a structure having a gradient of pores in the thickness direction.

(2) Resin Impregnation and Curing

After the process of forming the carbon fiber pre-web, the carbon fiber structure (carbon fiber pre-web) is impregnated with a slurry including a thermosetting resin and carbon powders, and then dried to obtain an impregnated carbon fiber pre-web. The thermosetting resin is, for example, an epoxy resin or a phenolic resin, specifically a phenol formaldehyde resin. The carbon powders may be carbon powders used in the process of forming a microporous layer described below. As the dispersion medium of the slurry, water is mainly used, and a water-soluble dispersant may be used in order to increase dispersibility. The carbon powders may be at least one selected from the group consisting of carbon black, carbon aerosol, carbon nanotube, carbon nanofiber, carbon nanohorn powder, and natural or synthetic graphite powder.

After the carbon fiber structure (carbon fiber pre-web is impregnated and dried as above, heat and pressure are applied thereto to cure the thermosetting resin and compress the carbon fiber pre-web. In this case, the heat treatment temperature may be suitably selected from a temperature range of about 100° ° C. to 200° C.

(3) Carbonization and Graphitization

High-temperature heat treatment of the carbon fiber pre-web having undergone the thermal curing process is performed in an inert atmosphere to carbonize and graphitize the above-described carbon fiber pre-web, thereby obtaining a carbon fiber web, that is, the carbon substrate according to the present disclosure. The carbide of the organic polymer formed in this way serves as a binder resin that binds the constituent components. In the present disclosure, in order to make the carbide have a pronounced graphite structure, the carbon substrate is subjected to a graphitization process in which the carbon fiber pre-web is heat-treated at a temperature of more than 2,000° C., for example, more than 2,100° C., more than 2,200° C., more than 2,300° C., or more than 2,400° C. in an inert gas atmosphere such as nitrogen or argon gas.

(4) Optional Hydrophobization Process

When the carbon substrate is treated with a fluorinated resin suspension or emulsion, a hydrophobic carbon substrate impregnated with the fluorinated resin may be obtained. Finally, the fluorinated resin is melted, and is then applied on the surface of the carbon fibers, the carbon powders, and applied in the space formed between the carbon fibers and the carbon powders, thereby obtaining a hydrophobic carbon substrate exhibiting water repellency. This hydrophobization process is an optional process. The fluorinated resin may be at least one selected from polytetrafluoroethylene (PTFE), tetrafluoroethylene-perfluoroalkyl vinyl ether copolymer (TFE-PFA), tetrafluoroethylene-hexafluoropropylene copolymer (FEP), and polychlorotrifluoroethylene (PCTFE), tetrafluoroethylene-ethylene copolymer (ETFE), and polyfluorovinylidene (PVDF).

(5) Application and Formation of Microporous Layer

Subsequently, a microporous layer is applied on the above carbon substrate according to a conventional method and fired to obtain a gas diffusion layer (GDL). The pore size of the microporous layer may be in a range of 0.1 μm to 20 μm, for example, 2 μm to 20 μm. The thickness of the microporous layer is not particularly limited, but may be 20 μm to 200 μm, for example, 20 μm to 100 μm, 20 μm to 80 μm, 20 μm to 60 μm, 20 μm to 50 μm, or 30 μm to 50 μm.

The electrode for a fuel cell of the present disclosure includes the substrate for a gas diffusion layer of the present disclosure, and may be used as a cathode or anode of a fuel cell.

The membrane electrode assembly for a fuel cell of the present disclosure includes the above-described electrode of the present disclosure.

The fuel cell of the present disclosure includes the above-described membrane electrode assembly of the present disclosure.

Hereinafter, the present disclosure will be described in more detail using the following examples, but the present disclosure is not limited to the following examples.

Preparation of Carbon Substrate

Comparative Example 1 (CE1)

50 g of carbon fibers having a carbon content of about 95%, a diameter of about 7 μm and a fiber length of about 6 mm, prepared from polyacrylonitrile (PAN), 50 g of carbon fibers having a carbon content of 95%, a diameter of about 7 μm, and a fiber length of about 12 mm, prepared from polyacrylonitrile (PAN), 1 g of a dispersant (Triton X-100), and PVA short fibers 12 g having a fiber length of about 6 mm were introduced into 200 L of water, and were uniformly dispersed for about 20 minutes by mechanical mixing at a speed of 1,500 rpm to obtain a dispersion for forming a carbon fiber pre-web.

After the dispersion was put into a tank of a papermaking machine, 300 L of water was added, followed by stirring. Then, the dispersion was supplied to an inclined fourdrinier apparatus equipped with a 120 #wire mesh, and water was removed by a vacuum pump. In this way, carbon fibers were deposited on the wire mesh by passing the dispersion through the wire mesh to form a carbon fiber pre-web in the form of a non-woven type.

The carbon fiber pre-web was impregnated with a slurry (the weight ratio of a phenolic resin/graphite particles=50/50, the total solids content of the mixture: about 20 wt %), in which a phenolic resin solution (weight average molecular weight: about 3,000 to 5,000, solvent: N-methyl-2-pyrrolidone) and graphite particles (manufacturer: Asbury Carbons, model name: 5991) were dispersed, in an amount of about 3 mg/cm².

Subsequently, the carbon fiber preweb impregnated with the phenolic resin and the graphite particles was heated to a temperature of about 1,000° C. under a nitrogen or argon atmosphere to carbonize the phenolic resin and PVA components, thereby obtaining a carbon fiber web including the carbide binding the carbon fibers. The carbonization process was performed by heat-treating the carbon fiber pre-web for about 30 minutes in a carbonization furnace supplied with a nitrogen or argon gas at a flow rate of about 30 L/min.

Subsequently, the carbonized carbon fiber web was heat-treated at a temperature of about 1,400° ° C. for about 30 minutes in a graphitization furnace supplied with a nitrogen or argon gas at a rate of about 10 L/min to graphitize the carbonized carbon fiber web. As a result, a carbon substrate having properties as shown in Table 1 below was obtained.

Example 1 (E1)

The carbon fiber pre-web impregnated with the phenolic resin and the graphite particles was obtained in the same manner as in Comparative Example 1. The carbon fiber pre-web was heated to a temperature of about 1,000° ° C. under a nitrogen or argon atmosphere to carbonize the phenolic resin and PVA components, thereby obtaining a carbon fiber web including the carbide binding the carbon fibers. The carbonization process was performed by heat-treating the carbon fiber pre-web for about 30 minutes in a carbonization furnace supplied with a nitrogen or argon gas at a flow rate of about 30 L/min.

Subsequently, the carbonized carbon fiber web was heat-treated at a temperature of about 2.000° C. for about 30 minutes in a graphitization furnace supplied with nitrogen or argon gas at a rate of about 15 L/min to graphitize the carbonized carbon fiber web. As a result, a carbon substrate having properties as shown in Table 1 below was obtained.

Example 2 (E2)

The carbon fiber pre-web impregnated with the phenolic resin and the graphite particles was obtained in the same manner as in Comparative Example 1. The carbon fiber pre-web was heated to a temperature of about 1,000° ° C. under a nitrogen or argon atmosphere to carbonize the phenolic resin and PVA components, thereby obtaining a carbon fiber web including the carbide binding the carbon fibers. The carbonization process was performed by heat-treating the carbon fiber pre-web for about 30 minutes in a carbonization furnace supplied with a nitrogen or argon gas at a flow rate of about 30 L/min.

Subsequently, the carbonized carbon fiber web was heat-treated at a temperature of about 2.300° C. for about 30 minutes in a graphitization furnace supplied with a nitrogen or argon gas at a rate of about 15 L/min to graphitize the carbonized carbon fiber web. As a result, a carbon substrate having properties as shown in Table 1 below was obtained.

Example 3 (E3)

The carbon fiber pre-web impregnated with the phenolic resin and the graphite particles was obtained in the same manner as in Comparative Example 1. The carbon fiber pre-web was heated to a temperature of about 1,000° C. under a nitrogen or argon atmosphere to carbonize the phenolic resin and PVA components, thereby obtaining a carbon fiber web including carbide binding the carbon fibers. The carbonization process was performed by heat-treating the carbon fiber pre-web for about 30 minutes in a carbonization furnace supplied with a nitrogen or argon gas at a flow rate of about 30 L/min.

Subsequently, the carbonized carbon fiber web was heat-treated at a temperature of about 2.500° C. for about 30 minutes in a graphitization furnace supplied with a nitrogen or argon gas at a rate of about 15 L/min to graphitize the carbonized carbon fiber web. As a result, a carbon substrate having properties as shown in Table 1 below was obtained.

TABLE 1

|  |  | Example 1 | Example 2 | Example 3 | Comparative Example 1 |
|---|---|---|---|---|---|
| Graphitization treatment temperature | ° C. | about 2,000 | about 2,300 | about 2,500 | about 1,400 |
| Areal weight | g/m² | | 35 ± 2 | | |
| Thickness | μm | | 180 ± 20 | | |
| Bragg diffraction angle 2θ | ° | 26.398 | 26.414 | 26.412 | 26.435 |
| interplanar distance d(002) | Å | 3.369 | 3.359 | 3.356 | 3.372 |
| Electrical resistance | mΩ · cm² | 5.57 | 5.49 | 4.87 | 5.72 |

Referring to Table 1, each of the carbon substrates of Examples 1 to 3 that have undergone an effective graphitization process is characterized in that it has a smaller Bragg diffraction angle 2θ and a smaller interplanar distance d (002) than those of the carbon substrate of Comparative Example 1. Specifically, each of the carbon substrates of Examples 1 to 3 has a Bragg diffraction angle 2θ of less than 26.435° and a smaller interplanar distance d(002) of less than 3.372 Å. More specifically, each of the carbon substrates of Examples 1 to 3 has a Bragg diffraction angle 2θ in a range of 26.398° to 26.414°, which is less than 26.435° of Comparative Example 1, and a interplanar distance d(002) in a range of 3.356 Å to 3.369 Å, which is less than 3.372 Å of Comparative Example 1. It may be found that the carbon substrates of Examples 1 to 3 having these characteristics have significantly smaller electrical resistance values than the carbon substrate of Comparative Example 1 at the same areal weight and thickness, and thus their electrical conductivity is significantly improved.

Preparation of Gas Diffusion Layer

Comparative Example 2 (CE2)

1000 g of deionized water, 20 g of a dispersant (Triton X-100), 92 g of carbon black (Vulcan XC-72), and 25 g of 60 wt % polytetrafluoroethylene (PTFE) dispersion were added and mechanically mixed to obtain a composition for a microporous layer (MPL).

The composition for a microporous layer (MPL) was applied on the carbon substrate obtained in Comparative Example 1, dried at about 120° C., and sintered at about 350° ° C. for 30 minutes in an air atmosphere to obtain a gas diffusion layer.

Example 4 (E4)

The composition for a microporous layer (MPL) obtained in Comparative Example 2 was applied on the carbon substrate obtained in Example 1, dried at about 120° C., and sintered at about 350° C. for 30 minutes in an air atmosphere to obtain a gas diffusion layer.

Example 5 (E5)

The composition for a microporous layer (MPL) obtained in Comparative Example 2 was applied on the carbon substrate obtained in Example 2, dried at about 120° C., and sintered at about 350° C. for 30 minutes in an air atmosphere to obtain a gas diffusion layer.

Example 6 (E6)

The composition for a microporous layer (MPL) obtained in Comparative Example 2 was applied on the carbon substrate obtained in Example 3, dried at about 120° C., and sintered at about 350° C. for 30 minutes in an air atmosphere to obtain a gas diffusion layer.

Physical properties of the gas diffusion layers obtained in Examples 4 to 6 and Comparative Example 2 are summarized in Table 2 below.

TABLE 2

|  |  |  | Example 4 | Example 5 | Example 6 | Comparative Example 2 |
|---|---|---|---|---|---|---|
| Gas diffusion layer | Areal weight | g/m² | | 80 ± 2 | | |
|  | Thickness | μm | | 220 ± 20 | | |
|  | Electrical resistance | mΩ · cm² | 8.7 ± 0.5 | 8.2 ± 0.5 | 5.8 ± 0.2 | 9.5 ± 0.5 |
|  | Compressibility | % | | 79 ± 2 | | |
|  | Current density @0.6 V | A/cm² | 1.52 | 1.56 | 1.65 | 1.46 |

Referring to Table 2, it may be found that each of the gas diffusion layers formed using the carbon substrates having improved electrical conductivity of Examples 1 to 3 has almost the same mechanical properties as the gas diffusion layer formed using the carbon substrate of Comparative Example 1 at the same areal weight and thickness, but has more improved current density as compared with the gas diffusion layer formed using the carbon substrate of Comparative Example 1. The further improved cell voltage characteristics exhibited by the gas diffusion layers of Examples 1 to 3 will be described in more detail with reference to FIGS. 1 and 2 below.

The physical properties summarized in Tables 1 and 2 above were evaluated according to the following procedures.

Evaluation Example 1: Areal Weight Measurement

Areal weight was calculated according to the ASTM D-646 standard. That is, the sample was cut so that width and length were 225 mm, respectively, using a cutter. The width and length were measured using a measuring machine (Mitutoyo, 500-714). The sample cut to an area of 506.25 cm² was placed on a scale capable of measuring the weight of the sample up to 0.001 g, and the weight thereof was measured, divided by the area, and converted using the following calculation equation.

Areal area (unit: g/m$^2$)=weight (g)/area (cm$^2$)×10,000$^2$/1 m$^2$

Evaluation Example 2: Thickness Measurement

Thickness measurement was performed using a measuring instrument (TMI, 49-56 digital micrometer thickness tester) having a pressure foot diameter of 16 mm (area: 2.00 cm$^2$) and a measurement accuracy of 1 μm in accordance with ISO 534. Thicknesses of 10 or more locations were measured, and average value thereof was obtained.

Evaluation Example 3: Measurement of Bragg Diffraction Angle 2θ and Interplanar Distance d(002)

The full width at half maximum (FWHM) of an X-ray diffraction (XRD) peak for a particular crystal plane of a crystal is an independent variable inherent to crystals that hardly changes in the measurement method. That is, the absolute value of FWHM hardly changes by an XRD apparatus, X-ray power, step size of measuring points, scan speed, and retention time of a detector, but only the peak intensity and signal to noise ratio thereof change. The determination of crystal grain size of 50 nm to 100 nm is well established by the theoretical Sherrer formula. The method of determining the crystal grain size using the Scherer formula ultimately depends on the FWHM size, and in the same sample, the same FWHM value is shown even when measured using any XRD apparatus.

Accordingly, each of the carbon substrates obtained in Examples 1 to 3 and Comparative Example 1 was mounted on a high-resolution X-ray diffractometer (X'Pert Pro MRD, PANAnalytical) as a measurement specimen to obtain an XRD peak of the (002) crystal plane of the specimen.

The XRD peak obtained in this way was fitted using a software to obtain a Bragg diffraction angle 2θ, and a interplanar distance d(002) was obtained using the relationship of the following Equation (1).

$$d(002)=\lambda/2 \sin \theta \qquad (1)$$

d(002): interplanar distance of the carbon substrate;
λ: wavelength of X-ray generated from Cu-Kα source
θ: diffraction angle.

Evaluation Example 4: Measurement of Electrical Resistance

A voltage drop (V) generated by passing a current of 1 A in the thickness direction while applying a pressure of 600 N into four carbon substrates or gas diffusion layers to be measured between gold-coated copper (Cu) plates was measured. Again, a voltage drop of the two carbon substrates or gas diffusion layers was measured, and an electrical resistance value was calculated from a difference between the two voltage drops.

Evaluation Example 5: Compressibility

The gas diffusion layers obtained in Examples 4 to 6 and Comparative Example 2 were formed into a circular shape having a diameter of 24 mm, and the thicknesses of five locations was measured in the same manner as in Evaluation Example 2, and an average value was calculated and written as $T_0$. One thickness-measured gas diffusion layer formed in the circular shape was inserted between gold-coated copper plates processed into a circle having a diameter of 25 mm, and was fixed to the lower end of a load of a universal tester (Instron, UTM 5537, UK) equipped with a displacement measuring device to make it zero. The displacement value of the displacement measuring device when a force of 90N was applied using the universal tester was set to $d_{90N}$, and the displacement value thereof when a force of 450N was applied in the same manner was confirmed to be $d_{450N}$. These values were substituted into the following Equation (2) to calculate the compressibility of the gas diffusion layer.

$$\text{compressibility } (\%)=T_{450N}/T_{90N}\times100 \qquad (2)$$

Here, $T_{90N}=T_0-d_{90N}, T_{450N}=T_0-d_{450N}$

Evaluation Example 7: Unit Cell Evaluation

The gas diffusion layers obtained in Examples 4 to 6 and Comparative Example 2 were used as a gas diffusion layer for an anode and a gas diffusion layer for a cathode, and were attached to a membrane coated with a commercial catalyst (manufacturer: Gore, product number: PRIMEA 5730) to assemble a unit cell. Hydrogen was provided to the anode, and air was provided to the cathode to measure a voltage change of a fuel cell depending on current density under the conditions of an electrode area of 25 cm$^2$, a temperature of about 65° C., a relative humidity of 100%, and atmospheric pressure. The results thereof are shown in FIGS. 1 and 2.

Figure 1:
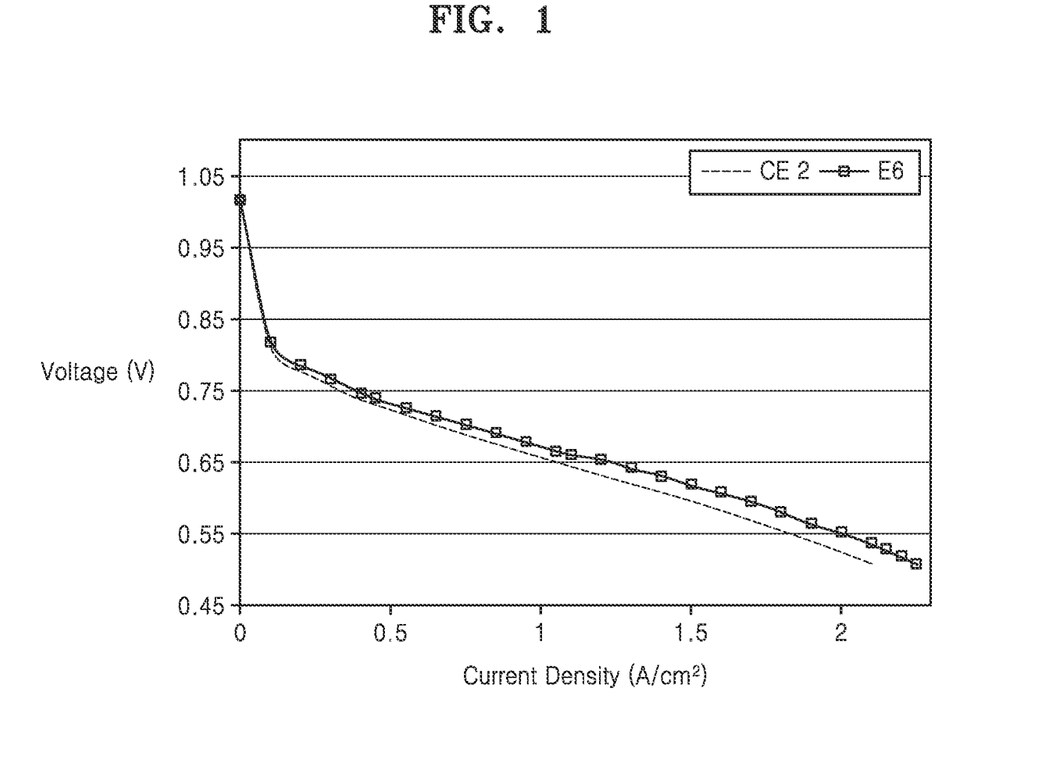
FIG. 1 shows current-voltage (IV) curves of unit cells to which the gas diffusion layers of Example 6 and Comparative Example 2 are applied, respectively.

FIG. 1 shows current-voltage (IV) curves of unit cells to which the gas diffusion layers of Example 6 and Comparative Example 2 are applied, respectively. Referring to FIG. 1, it may be found that the fuel cell employing the gas diffusion layer of Example 6 has superior cell voltage characteristics to those of the fuel cell employing the gas diffusion layer of Comparative Example 2. That is, when the gas diffusion layer was manufactured by applying the carbon substrate of Example 3 in which electrical resistance was decreased by the graphitization process, the electrical resistance was decreased from 9.5 mΩ·cm$^2$ to 5.8 mΩ·cm$^2$. This decrease in electrical resistance could be linked to an improvement in cell voltage characteristics in the unit cell.

Figure 2:
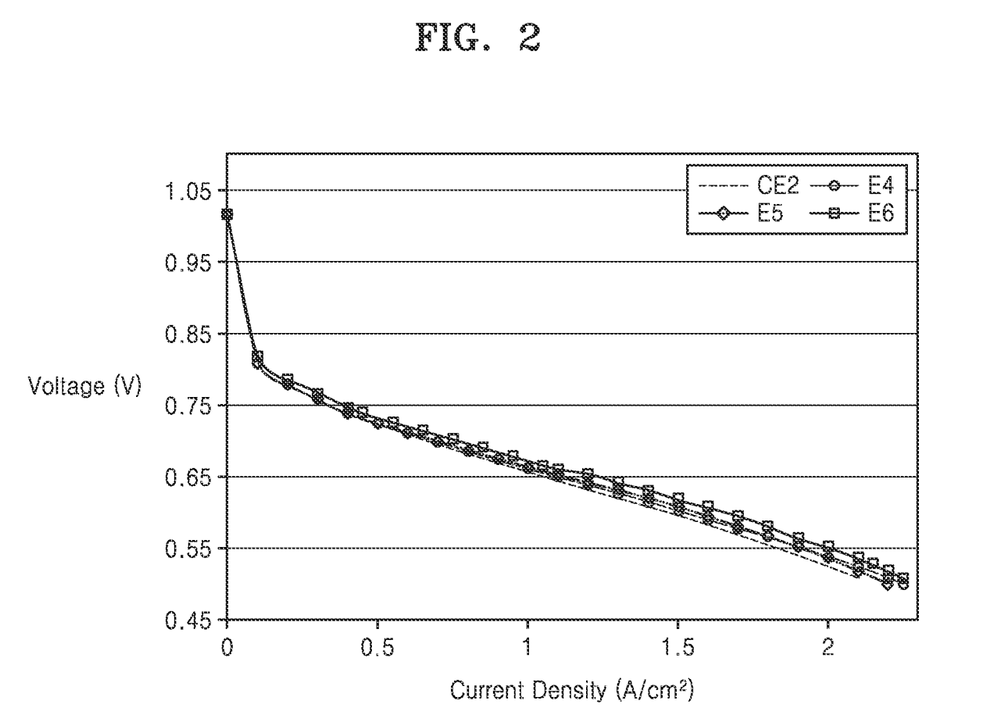
FIG. 2 is a graph simultaneously comparing current-voltage (IV) curves of unit cells to which the gas diffusion layers of Examples 4 to 6 and Comparative Example 2 are applied.

FIG. 2 is a graph simultaneously comparing current and voltage (IV) curves of unit cells to which the gas diffusion layers of Examples 4 to 6 and Comparative Example 2 are applied. Referring to FIG. 2, it may be found that the fuel cell employing each of the gas diffusion layers of Examples 4 and 5 also has superior cell voltage characteristics to those of the fuel cell employing the gas diffusion layer of Comparative Example 2. That is, when the gas diffusion layer was manufactured by applying each of the carbon substrates of Examples 1 and 2 in which electrical resistance was decreased by the graphitization process, the electrical resistance was decreased from 9.5 mΩ·cm$^2$ to 8.7 mΩ·cm$^2$ and 8.2 mΩ·cm$^2$, respectively. It may be found that this decrease in electrical resistance is linked to an improvement in cell voltage characteristics in the unit cell. In Table 2, the current density @0.6V represents the current density at a voltage of 0.6 V in the current-voltage (IV) curve of FIG. 2.

The invention claimed is:
1. A carbon substrate for a gas diffusion layer of a fuel cell, comprising:
   a first surface and a second surface opposite the first surface, wherein the carbon substrate is a porous carbon substrate;

a plurality of carbon fibers arranged irregularly to form a non-woven type; and a carbide of an organic polymer located between the carbon fibers to bind the carbon fibers to each other, wherein the carbide has a graphite structure, and wherein the carbon substrate has a Bragg diffraction angle 2θ of 26.398° or more and less than 26.435°, and an interplanar distance d(002) of 3.356 Å or more and less than 3.372 Å.

2. The carbon substrate of claim 1, wherein the carbon fibers include one type of carbon fiber having the same average length, or the carbon fibers include two or more types of carbon fibers having different average lengths from each other.

3. The carbon substrate of claim 2, wherein the two or more types of carbon fibers includes first carbon fibers having a first average length and second carbon fibers having a second average length, the first average length is less than the second average length, each of the first average length and the second average length is in a range of 3 mm to 25 mm, and a difference between the first average length and the average length is 3 mm to 20 mm.

4. A gas diffusion layer for a fuel cell, the gas diffusion layer comprising: the carbon substrate of claim 1; and a microporous layer formed on the carbon substrate.

5. An electrode for a fuel cell, the electrode comprising: the gas diffusion layer of claim 4.

6. The carbon substrate of claim 1, wherein the Bragg diffraction angle 2θ is from 26.398° to 26.414°.

7. The carbon substrate of claim 1, wherein the interplanar distance d(002) is from 3.356 Å to 3.369 Å.

8. A porous carbon substrate for a gas diffusion layer of a fuel cell, comprising:

a non-woven sheet including a first surface and a second surface opposite the first surface, the non-woven sheet comprising carbon fibers and a carbide of an organic polymer configured to bind the carbon fibers with one another, wherein the carbon fibers define pores of the porous carbon substrate, wherein the porous carbon substrate comprises a Bragg diffraction angle 2θ of from 26.398° to less than 26.435°, wherein the porous carbon substrate comprises an interplanar distance d(002) of from 3.356 Å to less than 3.372 Å, and wherein the porous carbon substrate has a pronounced graphite structure.

9. The porous carbon substrate of claim 8, wherein the porous carbon substrate comprises a Bragg diffraction angle 2θ of from 26.398° to less than 26.414°.

10. The porous carbon substrate of claim 8, wherein the porous carbon substrate comprises an interplanar distance d(002) of from 3.356 Å to less than 3.369 Å.

11. The porous carbon substrate of claim 8, wherein the porous carbon substrate comprises a Bragg diffraction angle 2θ of from 26.398° to less than 26.414°, and an interplanar distance d(002) of from 3.356 Å to less than 3.369 Å.

12. A gas diffusion layer for a fuel cell, the gas diffusion layer comprising:

the porous carbon substrate of claim 8; and a microporous layer disposed adjacent the porous carbon substrate.

13. An electrode for a fuel cell, the electrode comprising the gas diffusion layer of claim 12.

* * * * *